US011102081B1

(12) United States Patent
Tiwari et al.

(10) Patent No.: US 11,102,081 B1
(45) Date of Patent: Aug. 24, 2021

(54) QUANTITATIVE NETWORK TESTING FRAMEWORK FOR 5G AND SUBSEQUENT GENERATION NETWORKS

(71) Applicant: Accenture Global Solutions Limited, Dublin (IE)

(72) Inventors: Sanjay Tiwari, Bengaluru (IN); Shihab Ponnampadikkal Abdul Rahiman, Bangalore (IN); Mayur Kolhe, Bengaluru (IN); Arti Kumari, Gurgaon (IN); Neha Shishoo, Jammu (IN); Badarayan Panigrahi, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/035,655

(22) Filed: Sep. 28, 2020

(51) Int. Cl.
*G06F 15/173* (2006.01)
*H04L 12/24* (2006.01)
*H04L 29/08* (2006.01)
*G06F 16/903* (2019.01)

(52) U.S. Cl.
CPC ........ *H04L 41/14* (2013.01); *G06F 16/90335* (2019.01); *H04L 67/16* (2013.01)

(58) Field of Classification Search
CPC .... H04L 41/14; H04L 67/16; G06F 16/90335
See application file for complete search history.

(56) References Cited

U.S. PATENT DOCUMENTS

| 6,360,332 B1 * | 3/2002 | Weinberg | G06F 11/3664 714/38.13 |
| 8,862,950 B1 * | 10/2014 | Ginsberg | G06F 11/3688 714/57 |
| 9,647,919 B1 * | 5/2017 | Arguelles | H04L 43/50 |

(Continued)

FOREIGN PATENT DOCUMENTS

| CN | 107678942 A | 2/2018 |
| EP | 3629182 A2 | 4/2020 |
| WO | WO-2014088398 A1 | 6/2014 |

OTHER PUBLICATIONS

European Patent Office, Communication, Extended European Search Report issued for European Application No. 20207062.9, dated Apr. 20, 2021, 10 pages.

*Primary Examiner* — Padma Mundur
(74) *Attorney, Agent, or Firm* — Norton Rose Fulbright US LLP

(57) ABSTRACT

The present disclosure provides a framework for quantitatively testing network services and their supporting APIs. To facilitate the testing, a testing script may be generated. The testing script may be parameterized with input data derived from a historical database. The testing script may be executed and responses received from the network during testing may be analyzed to determine metrics associated with execution of the testing script. The metrics may indicate successfully tested conditions, unsuccessfully tested conditions, untested conditions, other testing metrics, or a combination thereof. After the initial testing cycle a deter- (Continued)

mination is made regarding whether a stop condition has been satisfied and if it has not been satisfied, another testing cycle may be executed. The next testing cycle may utilize a different set of input data that may be dissimilar to the input data used in the previous testing cycle so that additional conditions and functionality may be tested.

18 Claims, 5 Drawing Sheets

(56) References Cited

U.S. PATENT DOCUMENTS

| | | |
|---|---|---|
| 10,684,940 B1 | 6/2020 | Kayal et al. |
| 2014/0026122 A1* | 1/2014 | Markande ............ G06F 11/3688 717/124 |
| 2015/0363295 A1* | 12/2015 | Gopalakrishnan ........................... G06F 11/3692 717/126 |
| 2016/0092557 A1* | 3/2016 | Stojanovic ............ G06F 16/254 707/723 |
| 2020/0026640 A1* | 1/2020 | Dhanaraj ............ G06F 11/3684 |

* cited by examiner

QUANTITATIVE NETWORK TESTING FRAMEWORK FOR 5G AND SUBSEQUENT GENERATION NETWORKS

TECHNICAL FIELD

The present application relates to network systems and more specifically to a quantitative network testing framework for testing networks and network services.

BACKGROUND

As $5^{th}$ Generation (5G) cellular technologies are deployed the number of devices supported by 5G networks is expected to increase significantly. For example, in addition supporting mobile devices (e.g., cellular phones, mobile hotspots, etc.), 5G networks are expected to support Internet of Things (IoT) devices, autonomous vehicles, and other devices. New services are also expected in order to support new functionality and services to support the new types of devices and connectivity provided by 5G networks. Enhanced application program interfaces (APIs) will be needed to support the 5G features and services being rolled out. For example, APIs supporting 5G networks will evolve from support of traditional telecommunications applications and services towards a larger role for network service providers in supporting intelligent solutions for enterprise, IoT systems, edge computing, and unified communications. While these APIs may enhance the services and functionality of 5G networks and the devices they support, traditional network testing mechanisms are not capable of testing the use cases and applications supported by those services and APIs.

SUMMARY

The present disclosure provides systems, methods, and computer-readable storage media for testing networks, network services, and APIs that support the network services in a deterministic and quantitative manner. Information for configuring testing operations may be stored in a variety of databases, such as a historical or input database, a test configuration database, and an API configuration database. The historical database may store information that may be used to configure testing scripts for testing the networks, such as user identifier and authentication information for simulating user requests to access network services or other types of information. The test configuration database may store information for a test plan that identifies the portions of the network to be tested, such as specific services and APIs, end-points, etc. The API configuration database may include information for configuring testing scripts with appropriate requests (e.g., API calls) for communicating information to the APIs of the network.

Once a test plan is determined and information for generating one or more testing scripts for conducting testing in accordance with the test plan is determined, the one or more testing scripts may be generated. The testing scripts may be configured to simulate interaction with the targeted portions of the network (e.g., services, APIs, etc.). As such, the testing scripts may include requests that are parameterized with authentication information obtained from the historical input database, as well as information that identifies the service(s) targeted during the testing. As the requests are provided to the network during testing, responses may be received from the network services and supporting APIs. The responses may be validated based on expected responses to determine whether responses are being handled correctly by the network.

Upon completion of the testing, the responses may be analyzed to identify untested conditions and portions of the services and APIs, errors that occurred during the testing (e.g., when an expected response appears to be different from the actual response due to incorrect parameters, etc.), conditions of the testing that passed, and other testing metrics. The testing metrics may be provided to a scoring engine that calculates various scores for the completed testing cycle and the scores may be used to determine whether a stop condition has been reached (e.g., a condition that indicates sufficient testing has been performed). If the stop condition has not been reached, the scores and possible even the other determined metrics may be provided to a data diffuser that is configured to modify the input data used to configure a subsequent testing cycle. For example, the data diffuser may select new testing data that is dissimilar to the previously used testing data in order to test any conditions that were not previously tested or for other purposes (e.g., to correct an error due to a data mismatch, etc.). The process of testing, analyzing and scoring the results, and modifying the input data used for testing may repeat until a stop condition is achieved.

Using the iterative process of embodiments, network functionality, services, and supporting APIs may be rapidly tested during each testing cycle. As the outcomes of the testing are received and analyzed, the testing process may be dynamically altered and refined such that data used for a subsequent testing cycle may be configured to capture a previously untested condition or function of the service, correct a particular error that occurred (e.g., due to an incorrect or missing piece of input data), or other types of testing improvements and refinements. Such capabilities ensure that the testing performed by embodiments of the present disclosure is conducted rapidly while ensuring that sufficient conditions of the services and APIs are tested. Additionally, the new data selected for each iteration of the testing process may be configured to minimize repetitive or redundant testing by selecting new input data that is dissimilar from input data associated with passed or successful test conditions, thereby reducing the time required for each subsequent testing cycle through elimination of performing testing on some aspects of the services and APIs multiple times.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
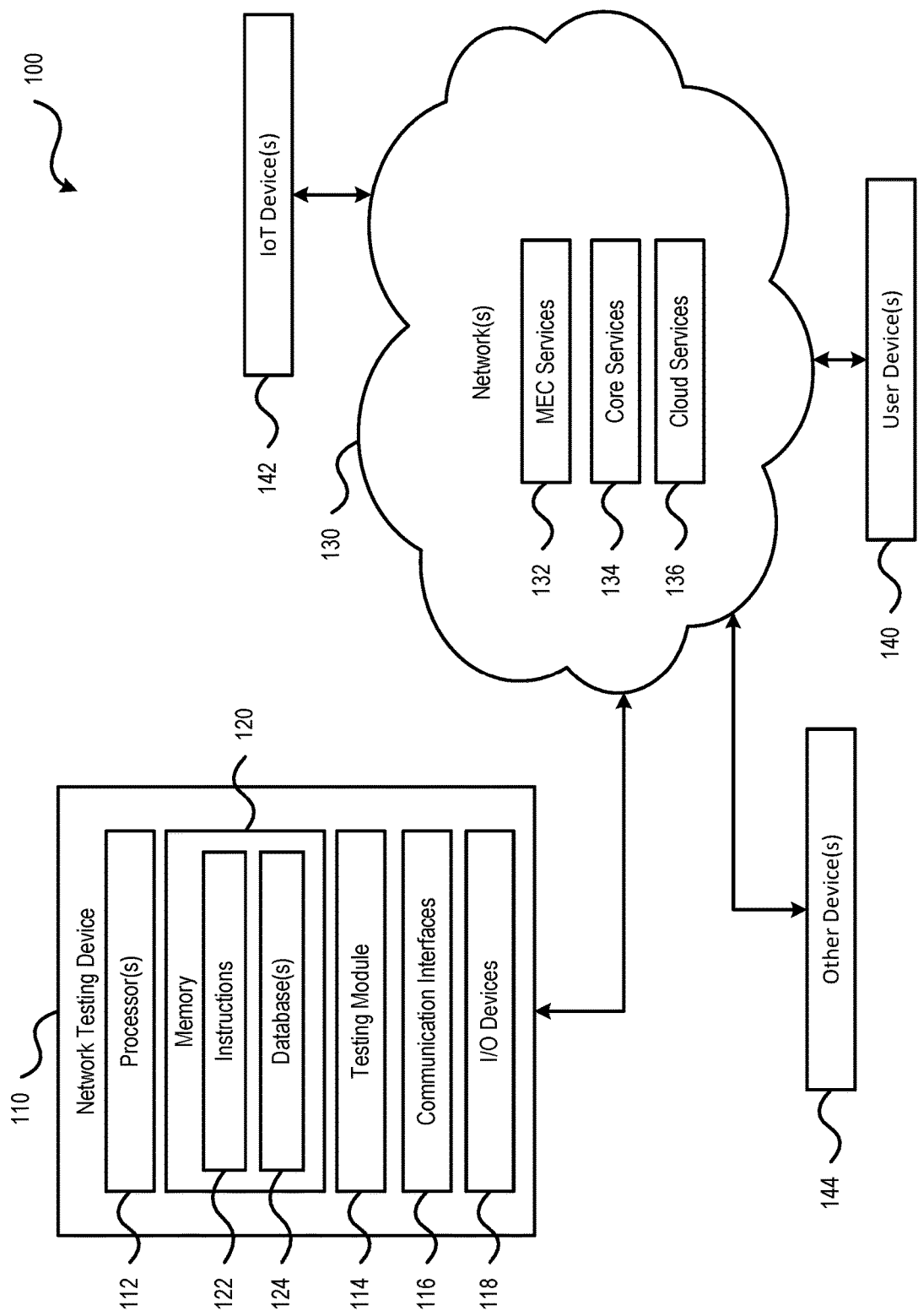
FIG. 1 is a block diagram illustrating a network testing framework in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The present disclosure provides systems, methods, and computer-readable storage media providing a framework for quantitatively testing network services and their supporting APIs. A testing device may be configured to store various types of data that may be used to facilitate quantitative testing of a portion of a network, such as a service provided over the network or an API supporting a service of the network. The testing device may be configured to generate a testing script that may be executed to test the portion of the network (e.g., the service, the supporting API, another portion of the network, and the like. The testing script may be parameterized with data derived from a historical database, such as data that allows the testing device to simulate interaction with the network service and/or API in the same manner as a user device. The testing scripts may be configured based on a fraction or subset of the total available (historical) input data, which may reduce the time that each testing cycle takes to complete.

As the testing script is executed, responses may be received from the network and analyzed to determine metrics associated with the testing. The metrics may identify successfully tested conditions of the service or API, unsuccessfully tested conditions of the service or API, untested conditions of the service or API, other testing metrics, or a combination different testing metrics. The various metrics determined based on the testing may enable the testing device to determine a state of the testing, such as how much of the service has been tested, what portions of the service have not been tested, what portions of the testing were successful (i.e., test passed), and what portions of the testing were not successful (i.e., test failed). After the initial testing cycle, the testing device may determine whether a stop condition has been satisfied. If the stop condition has been satisfied, testing may be terminated. If the stop condition has not been satisfied, another testing cycle may be executed. The next testing cycle may utilize a set of input data that is determined using a data diffusion process that selects at least some data that is dissimilar to the input data used in the previous testing cycle(s). Using this dissimilar information may enable the subsequent testing cycle to test additional conditions and functionality that may not have been previously tested because certain pieces of information may have been missing or included the wrong type of data. By dynamically varying the data used in connection with the testing, the testing device is able to ensure that each new testing cycle addresses at least some of the previously untested conditions and portions of the service(s) and API(s), although multiple cycles may be required until a set of input data that successfully tests a sufficient quantity of the test conditions is achieved. The variation of the input data by the data diffusion process may reduce redundant testing and improve the rate at which testing operations conclude (e.g., reduce the time required to reach a stop condition).

Referring to FIG. 1, a block diagram illustrating a network testing framework in accordance with aspects of the present disclosure is shown as a testing framework 100. As shown in FIG. 1, the testing framework 100 includes a network testing device 110 communicatively coupled to one or more networks 130. The one or more networks 130 may be configured to provide various services (e.g., voice services, data communication services, etc.) to devices, such as user devices 140 (e.g., smartphones, tablet computing devices, wireless hotspots, etc.), IoT devices 142 (e.g., sensors, etc.), or other types of devices (e.g., autonomous vehicles, etc.). As described in more detail below, at least a portion of the services provided by the one or more networks may utilize APIs and the network testing device 110 may be configured to facilitate quantitative testing of those APIs and the services they support.

As illustrated in FIG. 1, the network testing device 110 may include one or more processors 112, a memory 120, a testing module 114, one or more communication interfaces 116, and one or more input/output (I/O) devices 118. The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the network testing device 110 in accordance with aspects of the present disclosure.

The memory 120 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the network testing device 110 may be stored in the memory 120 as instructions 122 that, when executed by the one or more processors 112, cause the one or more processors 112 to perform the operations described herein with respect to the network testing device 110, as described in more detail below. Additionally, the memory 120 may be configured to store one or more databases 124. Exemplary aspects of the one or more databases 124 are described in more detail below.

The one or more communication interfaces 116 may be configured to communicatively couple the network testing device 110 to the one or more networks 130 to facilitate testing of the services and APIs of the one or more networks 130. Communication between the network testing device 110 and the one or more networks 130 may be facilitated via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The one or more I/O devices 118 may include one or more display devices, a keyboard, a stylus, one or more touchscreens, a mouse, a trackpad, a camera, one or more speakers, haptic feedback devices, or other types of devices that enable a user to receive information from or provide information to the entity device 110, such as information provided or input by a user (e.g., a user configuring testing of one or portions of a network or the network's services and/or APIs).

The testing module 114 may be configured to perform quantitative testing of different portions of the one or more networks 130. For example, the one or more networks 130 may include various nodes provide multi-access edge computing (MEC) services 132, core services 134, and cloud services 134. At least a portion of the services 132, 134, 136 may utilize APIs to provide services to the user devices 140, the IoT devices 142, and the other devices 144. Each of the APIs supporting the MEC services 132, the core services 134, and the cloud services 136 (collectively referred to as "the services") may be configured to receive requests, referred to as API calls, that may be used by devices to provide data to the APIs. Each of the API calls may be configured to receive one or more specific types and pieces of data, such as authentication data (e.g., network authentication data, service authentication data, etc.), service data (e.g., information identifying a requested service(s), etc.), device attributes (e.g., a user equipment (UE) identifier (ID), a media access control (MAC) address, etc.), or other types of parameters. The testing module 114 may be configured to test operations of the services and supporting APIs. It is noted that the testing performed by the testing module 114 may enable end-to-end testing of the services and APIs. Additionally, the testing module 114 may enable testing of specific segments of the one or more networks 130, such as testing the core services 134, or testing aspects of communication with the MEC services 132.

As an illustrative example, network nodes providing the MEC services 132 may include APIs as a set of complementary capabilities to enable applications and services environments at the edge of the one or more networks 130. The APIs for the MEC services may be defined over an M×2 reference and provide functionality to enable more efficient use of the services, such as registration, service discovery, availability notifications, de-registration and authentication and authorization. The APIs supporting the MEC services may allow applications (e.g., applications of user equipments (UEs)) to request certain application lifecycle management actions from the MEC nodes of the one or more networks 130, such as requesting a list of available MEC applications and instantiation of new MEC applications and termination MEC applications. Similarly, the MEC APIs allow the applications to receive notifications regarding changes in the MEC application IP addresses. The testing module 114 may be configured to test the functionality provided by the MEC APIs and the services supported by those APIs.

To facilitate the testing of the one or more portions of the network(s) 130 (e.g., the services and supporting APIs), the testing device 110 may maintain a library of data at the one or more databases 124. This library or database may include various types of data to facilitate testing of the APIs and services of the one or more networks 130. As an example, the data may include information that may be used to configure API calls to simulate requests for services provided by the one or more networks 130. Once the data for a testing cycle is determined, testing scripts may be automatically generated using the selected test data. The testing scripts may include software code configured to test at least a portion of the one or more networks 130, such as testing the services, APIs, and functionality provided via the portion of the one or more networks being tested. To illustrate, the testing scripts may be configured to initiate network connections that simulate the one or more user devices 140 and access the services of the one or more networks 130. The testing scripts may include API calls configured with parameter values determined from the testing data and may simulate requests of a user device to access one or more of the services provided by the one or more networks. During testing, the testing module 114 may select a subset of the data stored in the database and perform testing operations, which may include transmitting API calls to the one or more networks 130, evaluating results of those API calls, and verification of access to the requested services and functionality the one or more networks.

Because only a subset of data is used for testing there may be use cases and scenarios that could occur which were not covered by the testing. To ensure sufficient testing is performed, the testing module 114 may be configured to observe and evaluate the behavior of the APIs during the testing. For example, the testing module 114 may determine which scenario was executed, which condition was executed, what outcomes occurred, whether the outcomes match expected outcomes, or other aspects of the API functionality provided during the testing. Additionally, the testing module 114 may be configured to identify untested conditions and functionality of the APIs that were not covered by the testing and use the untested portions of the API. This information may then be used to determine additional testing data that may be used to configure additional testing of the APIs. The testing and refinement process described above may conducted, continually refining and updating the testing data to ensure sufficient testing of the services of the one or more networks 130 and the APIs supporting those services until a sufficient level of testing has occurred. For example, the testing module 114 may determine that a sufficient level of testing has occurred when the testing has covered a threshold percentage of the functionality and services provided by the API (e.g., 80%, 85%, 90%, 95%, 100%, or another percentage). As another example, the testing may be stopped when a threshold percentage of test cases have passed (e.g., 80%, 85%, 90%, 95%, 100%, or another percentage). It is noted that while determining to complete testing is described above as being based on verification that a threshold percentage of API services and functionality have been tested, such description has been provided for purposes of illustration, rather than by way of limitation and other metrics or mechanisms may be used to determine when testing should be determined to be complete. Additional aspects of the testing operations explained above are described in more detail below with reference to FIG. 2.

In an aspect, portions of the testing operations may be configured by a user. For example, a user (e.g., an information technology administrator or other individual responsible for testing the one or more networks 130) may compile data that may be stored in the databases 124 for use in testing operations, upload information regarding configurations of the APIs (e.g., parameters, data types, or other information used to configure API calls) of the network to be tested, or other types of information. Additional or alternatively, data utilized to support testing operations, such as the information described above, may be obtained by the networking device 110 from other sources. To illustrate, as service providers deploy new services to the one or more networks 130, information associated with those services and the APIs that support them may be provided (e.g., by the service providers) by the network testing device 110. In additional or alternative aspects, the network testing device 110 may be configured to obtain the above-described information (e.g., information that may be used to configure testing of APIs and services of the one or more networks 130) automatically. To illustrate, the network testing device 110 may be configured to periodically scan or probe the one or more networks 130 for information regarding services and supporting APIs deployed to the networks. In response to the probing, the networking device 110 may receive information about the services and supporting APIs deployed to the one or more networks 130. As the services and supporting APIs are identified by the network testing devices based on the probing, the network testing device 110 may be configured to request the configuration information from the APIs and services directly.

The network testing device 110 may also be configured to provide one or more graphical user interfaces that may enable the user(s) to view testing information, statics, and metrics associated with ongoing and completed testing operations. The testing information, statistics, and metrics may include information associated with how many tests have passed, how many tests have failed, view untested conditions and functionality, or other information about the testing operations. Additionally, the graphical user interfaces may be configured to allow a user to view the status of ongoing or current testing operations, such as to view real-time results of testing operations, scoring data, test configuration data, test analysis data, information stored in the one or more databases 124, API configuration data, or other types of information associated with testing operations facilitated by the network testing device 110. The graphical user interfaces may also provide functionality for generating reports based on testing operations, which may include all of the information described above, other types of information (e.g., scoring data, test configuration data, test analysis data, information stored in the one or more databases 124, etc.), or any combination of the above-described information.

The exemplary testing techniques described above enable leverage data driven methodologies to automate end-to-end testing of networks, network services, and APIs supporting the network services. Such capabilities enable the network testing device 110 to efficiently test the one or more networks 130 or portions thereof, including limiting testing to specific portions of the network(s) 130 (e.g., the MEC services 132, the core services 134, the cloud services 136, or combination thereof). Additionally, the feedback-based testing provided by the network testing device 110 based on evaluation of testing cycles (e.g., determining which conditions have been tested, which tests passed and failed, etc.) enables the testing to be performed using new data (e.g., data selected to cover untested or failed aspects of the network(s) 130) during a subsequent testing cycle. This feedback-based testing process enables each subsequent testing cycle to be refined to cover aspects of the testing that failed (e.g., due to improper data, missing data, etc.) as well as functionality of the APIs and services that were not tested during a previous testing cycle. The iterative nature of the testing provided by the network testing device 110 may result in more rapid completion of the testing as compared to previous testing techniques and systems. Additional advantages and improvements provided by the network testing framework of the present disclosure are described below. It is noted that while FIG. 1 illustrates the network testing device 110 as a single device, the functionality described herein with respect to the network testing device 110 may be provided by multiple devices (e.g., multiple servers) in a distributed fashion or other physical implementations.

Figure 2:
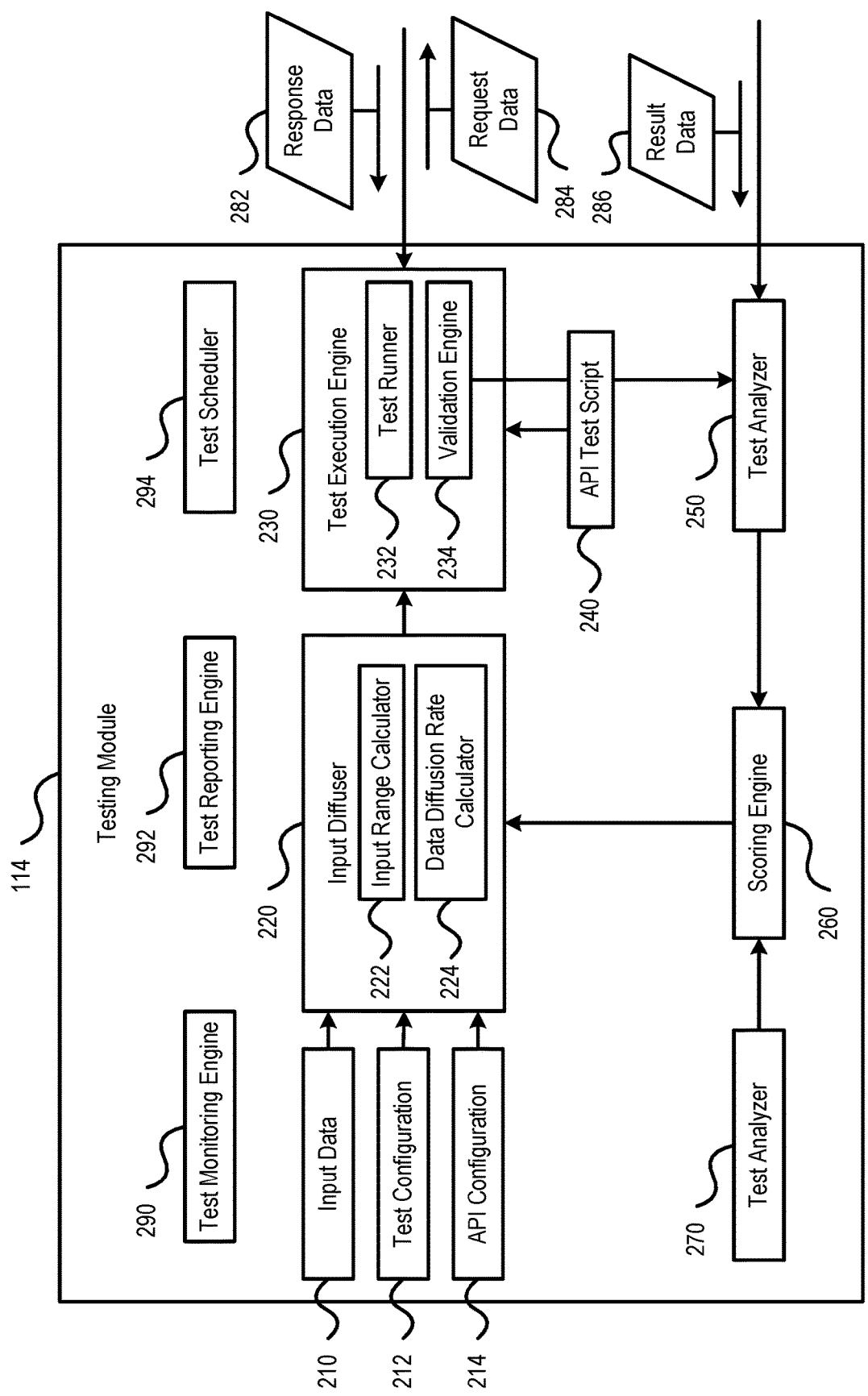
FIG. 2 is a block diagram illustrating additional aspects of a network testing framework for performing quantitative network testing in accordance with aspects of the present disclosure.

Referring to FIG. 2, a block diagram illustrating additional aspects of a framework for performing quantitative network testing in accordance with aspects of the present disclosure is shown. In particular, FIG. 2 illustrates exemplary aspects of the testing module 114, which as described above with reference to FIG. 1, is configured to perform testing operations for testing networks, network services, and APIs that support the networks and network services. As illustrated in FIG. 2, the testing module 114 may include a plurality of databases, including an input database 210, a test configuration database 212, and an API configuration database 214. Additionally, the testing module 114 may include an input diffuser 220, a test execution engine 230, API test script logic 240, a test analyzer 250, a scoring engine 260, and a test analyzer 270. As will be described below, these various components cooperate to provide network testing functionality in accordance with aspects of the present disclosure.

The input database 210 may store information that may be utilized to configure testing operations. For example, the input database 210 may store information that may be utilized to simulate operations of a user device (e.g., the user device(s) 140 of FIG. 1). Exemplary data that may be stored in the input database 210 may include a service, security data (e.g., authentication data, authorization data, etc.), tokens, user role data, attribute data, boundary values, parameter values, or other types of information. In an aspect, the information stored at the input database 210 may be derived from historic network data. For example, the one or more networks 130 of FIG. 1 may be configured to record information associated with actual interactions between user devices (e.g., the user devices 140) and the one or more networks (e.g., the one or more networks 130 of FIG. 1), operations of the services and APIs during those interactions (e.g., what data was provided, what responses were output, etc.), or other types of information. This information may be stored at the input database 210 to facilitate testing of different portions of the one or more networks, as described in more detail below.

The test configuration database 212 may store one or more test plans that identify which aspects of the network(s) are to be tested, such as one or more services, APIs, and the like. In some aspects the test configuration information (e.g., the test plan) may be generated by a user. For example, using the graphical user interfaces described above with reference to FIG. 1, the user may create a test plan that identifies the service(s), API(s), node(s), or other parts of the network(s) (e.g., the one or more networks 130 of FIG. 1) that are to be tested. In additional or alternative aspects, the test plan may be generated automatically. For example, the testing module 114 may periodically probe the network(s) to identify services, APIs, or other portions of the network(s), as described with reference to FIG. 1. When changes are detected based on the probing, such as the identification of a new service, a new API, a new node, or other changes (e.g., software version updates, etc.) are detected, the networking module 114 may generate a test plan configured to test the new or updated portions of the network(s). In an aspect, a combination of automatic and manual techniques may be used to generate test plans stored in the test configuration database. For example, probing may be performed to identify new or updated portions of the network(s) and then a graphical user interface may be used to display any changes detected in the networks based on the probing. The user may then view this information and configure test plans to test any portions of the network that have been changed since a previous testing of the network(s), such as to test a service or API that was previously tested but has been updated or to test a new service or API that has not been previously tested.

In an aspect, test plans may identify features to be tested, such as API features and functionality, pass/fail criteria for each test that is to be performed under the test plan, identify any portions of the API (or service) that are out of the scope of the test plan, or other types of information regarding testing of a network service and/or API supporting the network service. The features to be tested may be configured to facilitate end-to-end testing of APIs and services, such as specifying API-to-API test features configured to control testing of communication between two or more APIs. To illustrate, the test plan may specify a first API and a second API and may include test features to verify that the first API can seek or obtain data from the second API, or other types of testing. The pass/fail criteria may include information that may be used to determine whether a test of an API or a specific feature or functionality of the API is successful (i.e., passed the test) or unsuccessful (i.e., failed the test). It is noted that the exemplary types of features that may be specified in a test plan according to embodiments of the present disclosure have been provided for purposes of illustration, rather than by way of limitation and that test plans utilized in accordance with aspects of the present disclosure may include additional information or other types of information for configuring testing operations.

The ability to identify previously tested portions of the network and detect changes to previously tested portions of the network may enable rapid testing to be performed as changes to the network occur, which may improve the deployment of new services and APIs to the network(s). To illustrate, suppose a new service or API is deployed to the network. The testing module 114 may detect this change to the network automatically generate a test plan for testing the changed portions of the network (or prompt a user that changes to the network have occurred and provide graphical user interfaces and tools allowing the user to generate the test plan). After the testing is performed, feedback (e.g., test results) may be provided to the service provider associated with the new service or API. If any portions of the service or API did not pass during the testing, the service provider may use the feedback to diagnose any problems associated with the implementation of the service or API and update the service or API software based on the feedback. Once updated, the new version of the service or API software may be deployed to the network, where it may be quickly identified based on the probing and additional testing may be performed.

The API configuration database 214 may include information associated with the various APIs of the one or more networks under test. This information may identify a structure that should be used to construct API calls that may be transmitted to the network(s), as well as the types of data that may be used to populate the structure of the API calls. As described with reference to FIG. 1, API configuration information may be compiled from information collected from service providers that deploy the APIs on the network(s) to support network-based services. To illustrate, the API configuration information may be compiled by a user (e.g., a user associated with the network testing device 110 of FIG. 1), received from a service provider (e.g., an entity that deployed the API on the network(s)), or automatically collected by the network testing device 110 (e.g., via probing the network(s) to identify new services and APIs of a network).

The input diffuser 220 may be configured to utilize information obtained from the various databases (e.g., the input database 210, the test configuration database 212, and the API configuration database 214) to generate a set of data that may be used to test the network(s) or a portion of the network. For example, suppose that testing of one or more services and their supporting APIs and network nodes are to be tested. The input diffuser 220 may be configured to obtain a test plan for testing the one or more services and their supporting APIs from the test configuration database 212. Using the test plan, the input diffuser 220 may obtain information about the one or more APIs that support the service(s) to be tested from the API configuration database 214. The API configuration data may be used to determine the types of information that are needed to configure the test. For example, the API configuration data may indicate the types of information used to configure the API calls. Using the test plan and the API configuration data, the input diffuser 220 may select a subset of information from the input database 210 that may be used to perform an initial testing cycle for the service(s) and API(s) involved in the test. As will be explained in more detail below, the input data obtained from the input database for a particular test cycle may not include all available input data relevant to the test(s) and API(s) involved in the testing. Selecting a smaller dataset may enable each testing cycle to be performed more rapidly and minimize the likelihood that redundant testing is performed (e.g., testing of the same types of data for any test cycle), as will become more apparent from the description below.

The various types of information compiled by the input diffuser 220 may be provided to the test execution engine 230. The test execution engine 230 may utilize the information provided by the input diffuser 220 to generate testing scripts that may be used to test the network service(s) and supporting API(s) according to the test plan. For example, the test execution engine 230 may utilize the API configuration data and the input data received from the input diffuser 220 to produce request data 284. The request data 284 may include one or more API calls as well as other types of communications to simulate interaction of a user device (e.g., the user device 140 of FIG. 1) with a service or API provided by the network(s). The request data 284 (e.g., the test scripts, API calls, and other data generated to test the service(s) and API(s)) may be provided to a test runner 232, which may be configured to execute the scripts. To illustrate, the test runner 232 may transmit the request data 284 to the one or more networks in a manner that simulates a user device. It is noted that the request data 284 may include multiple transmissions to simulate a user device accessing the service(s) and API(s) under, such as to authenticate the user device to the network, communicate with one or more network nodes (e.g., edge nodes, core nodes, cloud nodes, etc.) associated with the tested service(s) and API(s), or other types of interactions. The test scripts executed by the test runner 232 may be automatically generated in a programming language, such as C++, Python, Pearl, and the like. Regardless of the programming language sued to produce the testing scripts, each testing script may include a plurality of lines of code that may be compiled and executed by the test runner 232 (or compiled elsewhere and only executed by the test runner 232). The test runner 232 may be configured to generate code coverage related information, such as metrics indicate the lines of code that were executed during testing, conditional blocks tested, methods executed, or other types of information that provides insights into the testing conducted by the test runner 232.1

As the request data 284 is transmitted to the networks, response data 282 may also be generated. The response data 282 may include data responsive to the request data 284 and may vary depending on the particular request data 284 that triggered transmission of the response data 282. For example, request data 284 and response data 282 exchanged to simulate authentication of a user device with the network may be different from the from the request data 284 and response data 282 exchanged with a service or API. It is noted that the testing scripts generated by the test execution engine 230 may include different pieces of information that may be required for each of the different types of requests that may be transmitted by the test runner 232, where the information used to configure the request data 284 may be derived from the subset of data selected from the input database 210 by the input data diffuser 220.

The API test script logic 240 may be configured to validate the response data 282 as it is received. For example, the API test script logic 240 may store information that specifies responses that should be received for each of the different types of request data 284 transmitted according to the test plan and the response data 282 received during testing. In an aspect, the API test script module 240 may be provided with the expected responses by the service provider(s) associated with the services being tested.

As shown in FIG. 2, the test execution engine 230 may include a test validation engine 234 that may be configured to validate the testing performed by the test runner 232. For example, the test validation engine 234 may be configured to validate the response data 282 received from the network(s) and verify that the responses are correct based on the information provided by the API test script logic 240. For example, the test script logic 240 may provide information that specifies particular request data 284 should result in response data 282 that includes certain values (e.g., a "201 Created" response code, etc.) from the API. Based on analysis of the response data 282 received for the request data 284 and whether it matches the expected results provided by the API test script logic 240, the validation engine 234 may generate a validation matrix that includes information associated with the success of each request (e.g., what request was transmitted, what the response to the request was, whether the response was correct, etc.), a response structure, and the values. The validation matrix may be provided to the test analyzer 250 where it may be used to evaluate the current cycle of testing, as described in more detail below.

The test analyzer 250 may be configured to capture and analyze results for each testing cycle. The results captured by the test analyzer may include information obtained from the test runner 232 (e.g., code coverage information, etc.), the validation engine 234 (e.g., the validation matrix, etc.), and the response data 282. and pushes to central test analyzer. The test analyzer 250 may also be configured to analyze service provider API specifications (e.g., because encryption may be in place, caching may be enabled, etc.). For examples, the test analyzer 250 may be communicatively coupled to a service provider system and may receive feedback from the service provider system regarding the scope of coverage covered by the test cycle. This information may identify the portions of the service or API that were tested during the test cycle, portions of the service or API that were not covered by the testing cycle or other types of information. The coverage data obtained by the test analyzer 250 may be provided to the scoring engine 260. In an aspect, the test analyzer 250 may receive information from the service provider system regarding the specification of the service or API and may determine the coverage provided by the testing based on the specification(s) and feedback provided by the validation engine 234. For example, the validation engine 234 may provide information about the request data 284 transmitted during a testing cycle and the response data 284 that was received in response to the request data 284. The feedback received from the validation engine 234 and the specification may analyzed by the test analyzer 250 to identify portions of the service or API that were tested and to identify untested portions of the service or API. The test analyzer 250 may be configured to generate the coverage data based on identification of the tested and untested portions of the service or API.

The test analyzer 270 may also be configured to analyze information associated with the requests and responses produced during the testing cycle. For example, the test analyzer 270 may be configured to analyze the request data 284 and the response data 282 to identify errors or other problems that were encountered during the testing (e.g., from the user device perspective). For example, the test analyzer 270 may be configured to analyze the request data 284 and response data 284 in view of a description or specification of the API(s) to identify discrepancies between the requests/responses used during testing and the specification of the API(s). This may enable identification of errors that occur due to improper configuration of API requests or handling of API responses, which may occur due to use of outdated specifications by API consumers (e.g., an entity that designs software that utilizes the APIs to provide services to user devices, etc.) if the API is modified or updated.

It is noted that the test analyzer 250 may be considered a service provider test analyzer and the test analyzer 270 may be considered a consumer test analyzer. This is because the test analyzer 250 may analyze aspects of the testing process that are relevant to functionality of the tested APIs from the service provider (i.e., API creator) perspective and the test analyzer 270 analyzes aspects of the testing process from the perspective of API consumers that design software that utilizes the APIs to provide functionality on network-connected devices, such as the user devices 140 of FIG. 1. Analyzing testing of the APIs from the service provider perspective and the API consumer perspective may help identify errors that occur due to improper design of software by API consumers (e.g., due to improper use of API specifications or outdated API specifications) as well as errors that occur from the service provider perspective. While the test analyzers 250, 270 are shown as separate modules, it is to be understood that functionality of the test analyzers 250, 270 may be integrated into a single device or module in some implementations.

The scoring engine 260 may be configured to generate scoring data based on the analysis performed by the test analyzers 250, 270. The scoring data may be provided to the input data diffuser 220 and used to configure a subsequent testing cycle, as described in more detail below. The scoring engine 260 may calculate the scoring data based on a plurality of metrics. For example, the scoring metrics user to calculate the scoring data may include an input success score metric, a likely input set metric, an error rate metric, and an unlikely input set metric.

The input success score metric may quantitatively assess the coverage of the test cycle being scored. For example, the input success score metric may calculated based on a plurality of parameters, including: a test cycle iteration [i], the total number of test cases (TC) to be tested, the number of test cases that have passed (TC[i]) for the testing cycle, the total lines of code (LC), the lines of code executed (LC[i]), the total number of conditional blocks (CB) to be tested, and the total number of conditional blocks passed (CB[i]) during the test cycle. In an aspect, the input success score may be calculated according to:

$$\text{inputSuccessScore} = (TC[i]/TC + LC[i]/LC + CB[i]/CB)/3, \quad \text{(Equation 1)}.$$

The likely input set metric may provide quantitative information about information that should be used for subsequent iterations of the testing cycle, which may help refine the input data selected by the input data diffuser 220 for further testing. The parameters utilized to calculate the likely input set metric may include: inputDataSet (DI[i]), historicalDataSet (HD), InputName(s) associated with skipped conditional blocks or failed test cases (inputFailed[i]), a similarity score (SS) of two inputs, and a likelyInput parameter. As explained above, each testing cycle may only utilize a subset of the data stored in the input database 210. The inputDataSet may represent the subset of information obtained from the input database 210 by the input diffuser 220 for the current testing cycle and the historicalDataSet parameter may represent a portion of the input database 210 relevant to the current testing scenario, where the inputDataSet represents a subset of the historicalDataSet. The similarity score (SS) of two inputs may be calculated using a Python program configured to determine the similarity between two input values. The likelyInput parameter may represent a set of values from the historical data (HD) where the SS is less than a threshold. To illustrate, the likelyInput parameter may be generated based on whether similarity scores determined between values of the inputFailed[i] parameter for the current test cycle and the HD are less than a threshold (e.g., 0.45, 0.5, 0.55, 0.6, etc.). For example, the likely input set metric may generated according to:

$$\text{likelyInputSet} = \Sigma\text{likelyInput} + \text{extremeValues} - \Sigma DI[i], \quad \text{(Equation 2)}.$$

As shown in Equation 2, the likely input set metric may produce a set of input data values that are dissimilar (e.g., SS<threshold) to input data values used for a current cycle of testing. Stated another way, the likely input set metric may enable the input diffuser 220 to determine, for any iteration or cycle of the testing, what data should be included as part of the next testing cycle. In this manner, each testing cycle is configured to include new information that is dissimilar to previous testing cycles, which may help capture new test cases and conditions of the APIs or services under test and eliminate redundant testing.

The error rate metric may provide information associated with the total number of test cases to be tested and the rate at which errors are encountered during testing. The error rate metric may be calculated according to:

$$\text{errorRate} = \Sigma\text{errors}[i]/TC, \quad \text{(Equation 3)},$$

where TC represents the total number of test cases and errors[i] includes information associated with the following: status code errors (statusCode[i]), error count value does not match (valueError[i]), error count type does not match (typeError[i]), log errors (logError[i]), response schema errors (schemaError[i]), and the like. ErrorRate may be a score that suggests the effectiveness of test data[i] used for the current test iteration cycle. The errorrate score (or metric) and success score (or metric) may be used as inputs goes to decide test completion criteria. For example, the stop condition may specify that test iteration cycles should continue when the success rate metric is greater than 90 and the error rate metric is less than 10 based on a particular configuration of the testing process. The success rate and error rate scores may not be mutually inclusive and may represent different test result aspects. For example, the API response attribute may be used to calculate the success rate and the response structure not matching may be used to calculate the error rate.

The unlikely input set metric may provide quantitative information about information that should not be used for subsequent iterations of the testing cycle, which may help refine the input data selected by the input data diffuser 220 for further testing. The parameters utilized to calculate the unlikely input set metric may include: inputDataSet (DI[i]), historicalDataSet (HD), a success values set (successValues [i]) representative of successful test conditions and associated data (e.g., data used for successful test conditions), and an inputAttributeSuccess (successAttributes[i]) representative of the similarity scores for the inputDataSet and the historicalDataSet. It is noted that the similarity scores utilized by the unlikely input set metric may be different from the similarity scores used by the likely input set metric. For example, whereas the likely input set metric utilized similarity scores that identified portions of the historical data set (e.g., the input database 210) that may be suitable for a next testing cycle (e.g., because the candidate data was dissimilar to the input data used for the current testing cycle—meaning the candidate data may be more likely to test any untested conditions or features of the services or APIs), the unlikely input set metric may be associated with similar scores that represent data that is similar to the input data used for the current (or previous) testing cycle(s). The unlikely input set metric may be used to identify portions of the historical data that should not be selected for a next testing cycle. to illustrate, the unlikely input set parameter may represent a set of values from the historical data (HD) where the SS is greater than (or greater than or equal to) a threshold. To illustrate, the unlikely input set parameter may be generated based on whether similarity scores determined between the data used for successful testing of conditions during the current test cycle and the HD are greater than (or greater than or equal to) a threshold (e.g., 0.45, 0.5, 0.55, 0.6, etc.). For example, the likely input set metric may generated according to:

$$\text{unlikelyInputSet} = \Sigma\text{unlikelyInput} - \Sigma DI[i], \quad \text{(Equation 4)}.$$

As shown in Equation 4, the unlikely input set metric may produce a set of input data values that are similar (e.g., SS>threshold or SS≥threshold) to input data values used for a current cycle of testing. Stated another way, the unlikely input set metric may enable the input diffuser 220 to determine, for any iteration or cycle of the testing, what data should not be included as part of the data used to configure the next testing cycle. In this manner, each testing cycle is configured to include new information that is dissimilar to previous testing cycles, which may help capture new test cases and conditions of the APIs or services under test and eliminate redundant testing.

As briefly described with reference to FIG. 1 and above, the outputs of the scoring engine 260 may be provided to the input diffuser 220 and used to select input data for a subsequent testing cycle. For example, testing conditions that were not passed or not successfully tested (e.g., due to data errors in the API calls or for other reasons) may be configured for further testing using a new set of input data selected by the input diffuser 220. The new set of input data may be selected based on the outputs of the scoring engine 260, such as selecting data based on the likely input data set metrics. It is noted that the data selected for the next iteration of the testing may still be a subset of the available data (e.g., a subset of the available data meeting the criteria of the likely input data set metrics). However, with each iteration of the testing cycle the available data for subsequent testing cycles may decrease as new data is selected for each testing cycle or iteration. As explained above, the testing may continue until a threshold metric indicative of a stop testing condition is achieved (e.g., a threshold number of conditions have been tested, a threshold percentage of conditions have been tested, a threshold number of tests have been passed, a threshold percentage of tests conditions have been passed, an error rate is below a threshold, other conditions, or combinations thereof, such as a threshold percentage of test conditions have passed and the error rate is below an error rate threshold).

In an aspect, there may be two sources of input data for each test iteration. A first data source may be a historical database and the second data source may be the input database 210. For example, when a test is run and completed, error and success data sets may be stored in the historical database. While planning a new test or new test iteration for the API(s), additional test data may be added to address new features or replace data which is expired. When any test or test iteration is run, data may be retrieved from both the sources to configure the testing process. In an aspect, an input range calculator 222 and a data diffusion rate calculator 224 may be utilized to generate the new data that is used for the subsequent testing operations. For example, the input range calculator 222 may determine adjustments for data ranges included in the new data selected from the input database 210 during the data diffusion process. The data diffusion rate calculator 224 may be configured to vary the rate at which new data is introduced into subsequent iterations of the testing cycle. For example, suppose that testing of a specific set of input values consistently returns an error due to missing or incorrect parameters within a particular request used during the testing. The data diffusion rate calculator 224 may be configured to systematically vary the input data used in the request resulting in the error message so that a correct set of data inputs may be identified that removes the error and allows the request to be successfully tested. The input range calculator 222 and the data diffusion rate calculator 224 may be configured to intelligently modify the data used during successive testing script executions in order to optimize each testing cycle to achieve testing of previously incomplete or untested conditions of the service(s) or API(s), which may improve the overall testing process and streamline each iteration of the testing process. As 4G, 5G, and subsequent generation networks begin to utilize APIs to expand their services and capabilities, the ability to rapidly test the services and APIs deployed on those networks may play a critical role in ensuring that those deployed services operate in an expected manner.

As shown above, the iterative testing process utilized by the testing module 114 of embodiments may use a subset of available data to configure testing of networks, network services, and the APIs that support the network services. Moreover, smaller subsets of data may be selected for each testing cycle, thereby allowing each testing cycle to be performed rapidly and feedback obtained regarding the results of the executed testing cycle. The feedback is then used to refine subsequent iterations of the testing, such as to include new ranges of data, new types of data, or other types of dissimilar data (e.g., data dissimilar to the data used in previous testing cycles), and the like. The use of different and new data in each testing cycle may allow new test conditions and use cases to be tested during each subsequent testing cycle and may eventually result in convergence to a sufficient level of testing. Once the testing has converged to the sufficient level of testing (e.g., as described above with respect to the stop testing condition(s)), the testing may be terminated.

In addition to the functionality described above, the testing module 114 may also include a test monitoring engine 290, a test reporting engine 292, and a test scheduler 294. The test monitoring engine 290 may be configured to provide information to a user regarding a status of the testing operations. For example, as described above with reference to FIG. 1, testing systems in accordance with embodiments of the present disclosure may provide graphical user interfaces that provide information to users regarding the state of testing operations. The test monitoring engine 290 may provide a graphical user interface that allows the user to see a state of the testing operations, such as to view a status of current testing cycle, results of previously completed testing cycles, and other information associated with monitored testing operations. The test reporting engine 292 may be configured to generate reports associated with monitored testing operations. For example, the test reporting engine 292 may be configured to generate reports that indicate a number of cycles or iterations required to test a portion of a network, the metrics associated with each cycle (e.g., number of tested and untested conditions, number of errors, number of passed conditions, and the like). The test scheduler 294 may provide a graphical user interface that allows a user to schedule testing operations to be performed at an optimum time, such as during off-peak hours of the network(s) 130 or another time. Alternatively, the test scheduler 294 may enable a user to configure parameters that enable testing to be automatically performed on an as needed basis, such as when new services or APIs (or updates to previously tested service and APIs) are detected.

Figure 3:
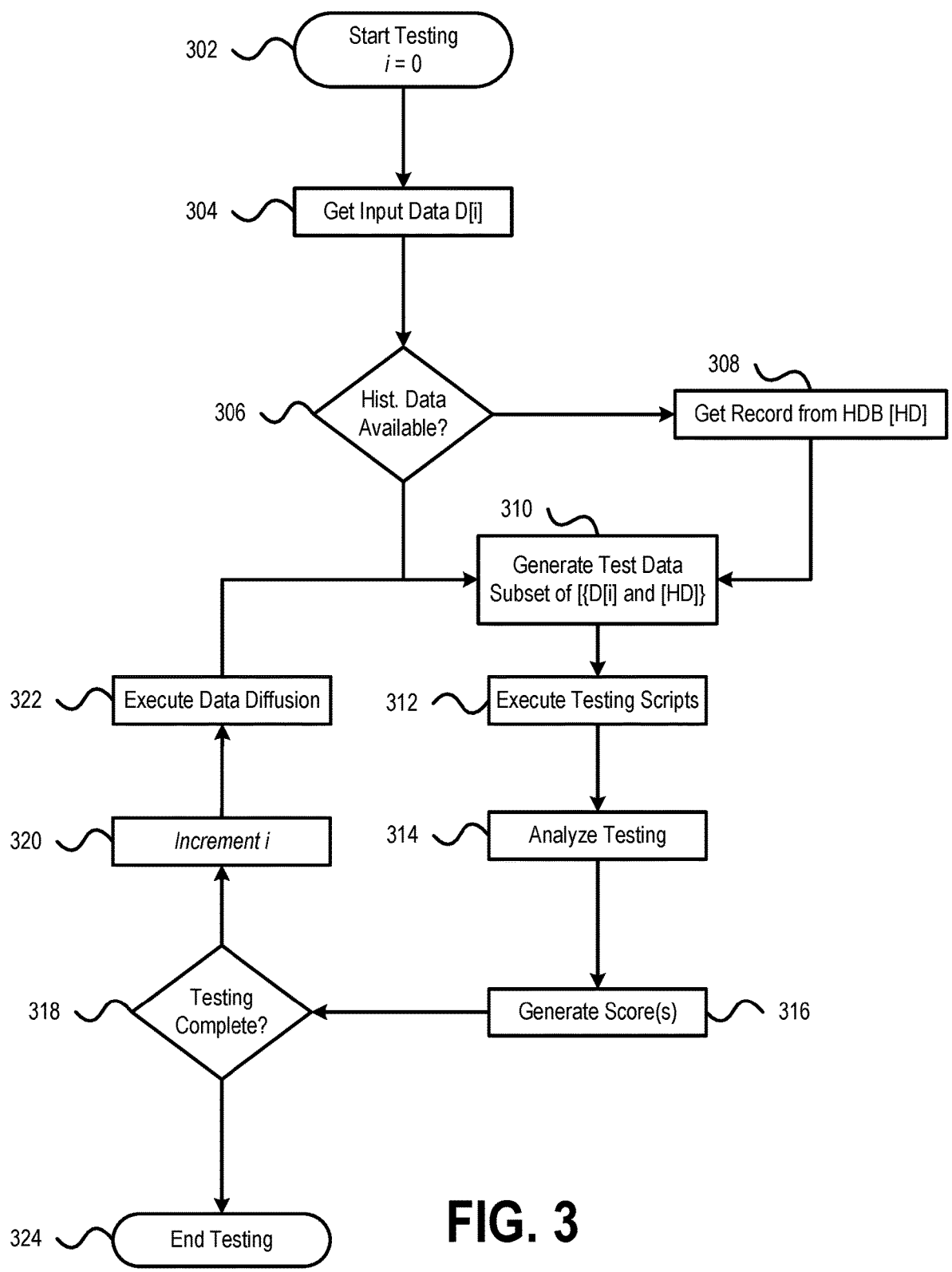
FIG. 3 is a flow diagram illustrating an iterative process for testing network services and their supporting APIs in accordance with aspects of the present disclosure.

The iterative nature of the data driven testing framework of embodiments is further illustrated in FIG. 3, which is a flow diagram illustrating an iterative process for testing network services and their supporting APIs in accordance with aspects of the present disclosure. As shown in FIG. 3, the iterative testing process may be begin at start block 302. In start block 302 an iteration counter (i) may be initialized to 0. Once the iteration counter is initialized, processing may proceed to block 304, where a determination is made as to whether suitable input data (D[i]) is available for conducting the testing. The determination of whether suitable data is available may be based on information stored in the input database 210, the test configuration database 212, the API configuration database 214, or combinations of these different databases. If data is available, processing may proceed to decision block 306, where a determination is made as to whether historical data is available. It is noted that the historical data considered at decision block 306 corresponds to data sets generated during previous tests conducted over a period of time (e.g., 1 week, 1 month, 3 months, or another time period) and may include information generated during those previous tests, such as error and success data sets.

If historical data is available, processing may proceed to block 308, where at least a portion of the historical data is retrieved from the historical database (e.g., by the "test generator 230 of FIG. 2"). The historical data may be scrubbed and structured in accordance with an API request structure (e.g., a configuration of an API request may be specified in the API configuration database). The historical data may then be merged with the test data retrieved from the input database 210. As described above, a subset of the input data may be selected for use during the first iteration of the testing process. However, as the testing process proceeds additional portions of the available data may be selected for use in testing, as will be apparent from the description below. It is noted that some of the historical data may be excluded from use during testing, such as based on whether any portions of the API are excluded from the test plan obtained from the test configuration database. As described above, the historical data may be updated during each test cycle. In an aspect, an identifier may be used to differentiate a current test from previous tests, such as a test id that may be unique for each test or test cycle. Data purges may be periodically scheduled to erase and remove data from the historical database and the input database, which may contain test data added by a test engineer to facilitate testing of features of the APIs.

Once the input data (and historic data) is selected (e.g., by the input data diffuser 220 of FIG. 2), testing data may be generated, at step 310. As described above, generation of the test data may be performed by the test execution engine 230 of FIG. 2, and may generate testing scripts that are configured with parameter values derived from the input data selected at step 306. Once the test data is generated it may be provided, at step 312, to a test runner (e.g., the test runner 232 of FIG. 2) that is configured to execute the testing scripts. Results of the execution of the testing scripts may be analyzed, at step 314. As described above with reference to the test analyzers 250, 270 of FIG. 2, analyzing the results of the testing scripts may include identifying test conditions that were covered and not covered by the testing scripts, errors encountered during the testing, and other metrics that may be used to score and evaluate the testing and determine when the testing is complete.

At step 316, the metrics and information generated during the testing analysis may be used to generate scores associated with the testing, as described above with reference to the scoring engine 260 of FIG. 2. The scores calculated at step 316 may be used at decision 318 to determine whether testing is complete. For example, the outputs of step 316 may be evaluated to determine whether a stop condition has been achieved by the testing. As described above, the stop condition may be based on a percentage of conditions tested, a percentage of errors encountered during testing, a percentage of conditions passed during testing, other conditions, or combinations of conditions. If it is determined, at decision step 318, the stop condition has been met, testing may be complete and may terminate, at end testing block 324. However, it is unlikely that testing will be completed after the first iteration of the testing (e.g., i=0) and the first time the process illustrated in FIG. 3 reaches decision step 318 it will likely be determined that testing has not been completed.

Each time it is determined that testing has not completed, processing may proceed to step 320, where iteration counter (i) may be incremented (e.g., i=i+1). Once the iteration counter has been incremented, processing may proceed to step 314, where data diffusion may be performed. As described above, during data diffusion new testing data may be selected (e.g., based on the unlikely data metrics, the untested conditions, the errors, etc.). After the new testing data is selected during the data diffusion process (e.g., step 322), processing may return to step 310, where the testing process may repeat using the new testing data derived from the data diffusion process. During each iteration (i) until the stop condition is reached (e.g., testing complete=yes, at step 318), testing may be analyzed, scored, and diffused so that with each cycle of the testing new testing conditions are tested, some of the errors that previously occurred may be resolved (e.g., due to newly selected testing data resulting from the diffusion process, step 322) and conditions that previously failed may pass. Moreover, as the testing data used in each iteration is different from and dissimilar to the testing data using the previous iterations, the likelihood that each subsequent testing cycle results in redundant testing may be minimized. These capabilities result in a testing process that may be used to quickly and efficiently test services and APIs deployed on a network regardless of whether the tested services are MEC services, core services, or cloud services and regardless of the entry point at which the testing begins or ends.

Figure 4:
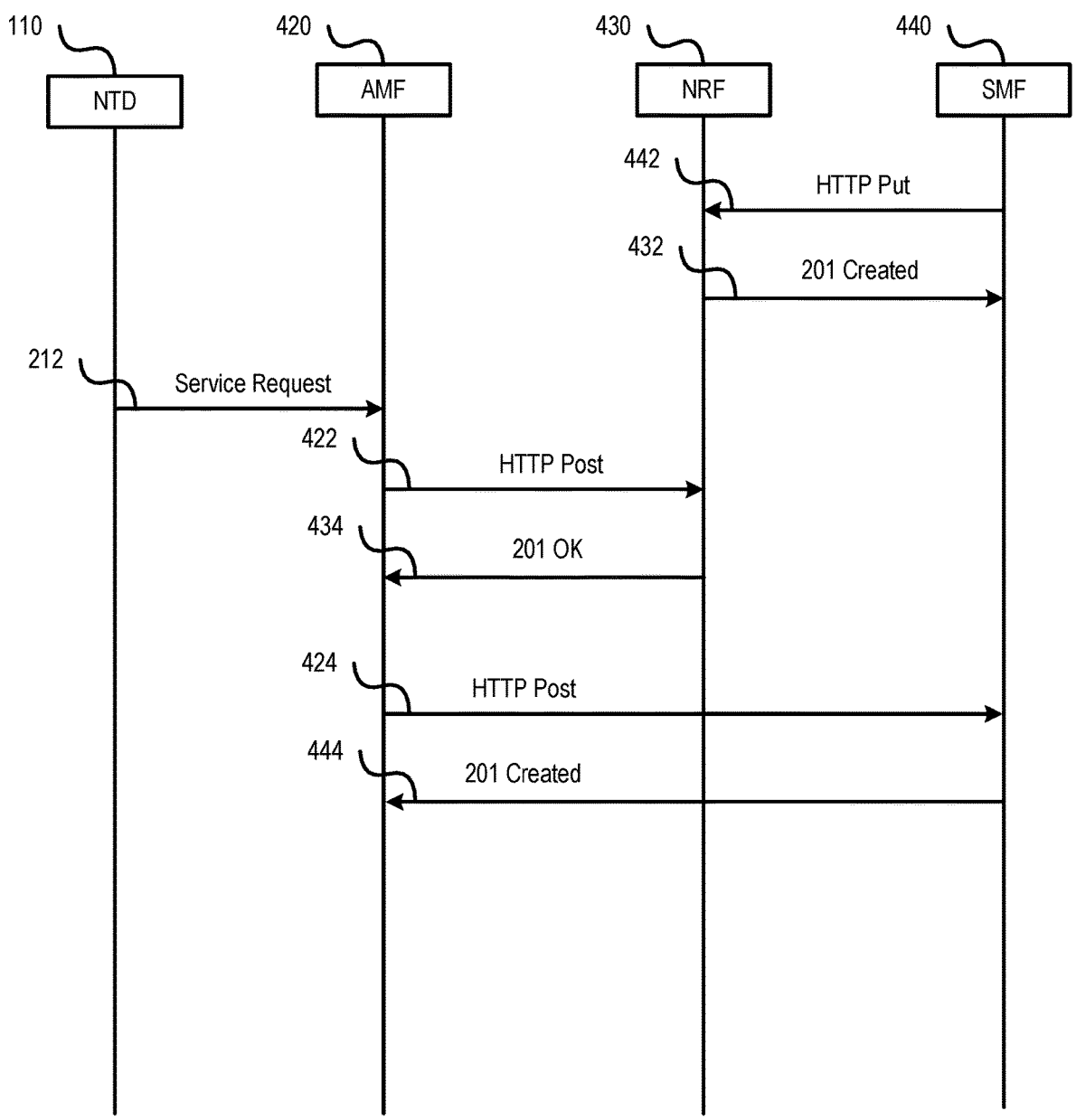
FIG. 4 is a ladder diagram illustrating exemplary aspects of testing network services and APIs in accordance with aspects of the present disclosure.

Referring to FIG. 4, a ladder diagram illustrating exemplary aspects of testing network services and APIs in accordance with aspects of the present disclosure is shown. In the example shown in FIG. 4, the testing simulates authentication with a service of a network using service layer interfaces that manage operations via multiple API requests and provide responses back to through intermediate network layers. In FIG. 4, an access and mobility management function (AMF) 420, a network resource function (NRF) 430, and a session management function (SMF) 440 are shown. The AMF 420 serves as the entry point for user equipment (UE), such as the user devices 140 of FIG. 1 or other devices. The NRF 430 may facilitate service discovery for other network functions, such as the AMF 420 and the SMF 440.

In the example shown in FIG. 4, the SMF 440 may register its service via transmission 442 (e.g., an HTTP Put request). The NRF 430 may transmit a response (e.g., "201 created") via the transmission 442, which may complete the service registration process. Once registered, the service provided by the SMF 440 may be discoverable to other functions of the network, such as the AMF 420.

To test the service, the network testing device 110 may transmit a service request 212 to the AMF 420. The AMF 420 may query the NRF 430 for a suitable SMF and the NRF 430 may transmit the address of the SMF 430 (e.g., due to the registration via transmissions 442, 432) to the AMF 420. Now that the AMF 420 has become aware of the services of the SMF 440 (e.g., via the service discovery process shown as transmissions 422, 434), the session may be established on the control plane level by the AMF 420 via the SMF 440. For example, the AMF 420 may transmit an HTTP post message 424 to the SMF 440 and the SMF 440 may respond with a 201 created message 444. During testing of the above-described functionality the testing scripts may result in different responses than those shown in FIG. 4 are received. For example, Table 1 illustrates possible responses that could be received during the various transmission exchanges shown in FIG. 4.

TABLE 1

| Response codes | Description |
| --- | --- |
| 201 Created | Upon success, the response body will contain the SUPI of the UE and the authentication indication. The HTTP response shall include a "Location" header that contains the resource URI of the created resource. |
| 400 Bad Request | This case represents the failure to start authentication service because of input parameter error. |
| 403 Forbidden | This case represents when the UE is not allowed to be authenticated. The "cause" attribute may be used to indicate one of the following application errors: AUTHENTICATION_REJECTED INVALID_SCHEME_OUTPUT |
| 404 Not Found | The "cause" attribute may be used to indicate the following application error: USER_NOT_FOUND |

Suppose that during the testing the transmission 422 resulted in the transmission 434 being a 400 Bad Request or 403 Forbidden response message instead of 201 OK message. In such instances, the bad request or forbidden message may be experienced due to incorrect or insufficient data being included in the transmission 422. Using the diffusion process described above, additional input data may be used to generate additional testing scripts that may include the correct or sufficient amount of data so that the response from the NRF 430 is the 201 OK message, rather the 400 Bad Request or 403 Forbidden messages. Similar testing may also be performed with respect to communications between the AMF 420 and the SMF 440. As shown Table 1, responses may have attributes, which may be analyzed (e.g., by the test analyzer 250 or the test analyzer 270) to evaluate the testing and provide feedback that may be used for scoring and/or selection of new testing data. For example, if a 403 Forbidden response is received with the attribute "AUTHENTICATION_REJECTED" then it may be determined that there was an error with the authentication credentials of format of the authentication request. This information may be used to configure a new authentication request that has new credentials or an updated format (or some other correction) that may be more likely to result in a successful response. It is noted that while FIG. 4 illustrates certain network features that may be tested using the techniques disclosed herein, the exemplary testing framework of embodiments may also be used to test other types network features and functionality, including, but not limited to: general registration processes, registration with AMF re-allocation, UE-initiated deregistration, network-initiated deregistration, UE triggered service requests, and network triggered service requests.

Figure 5:
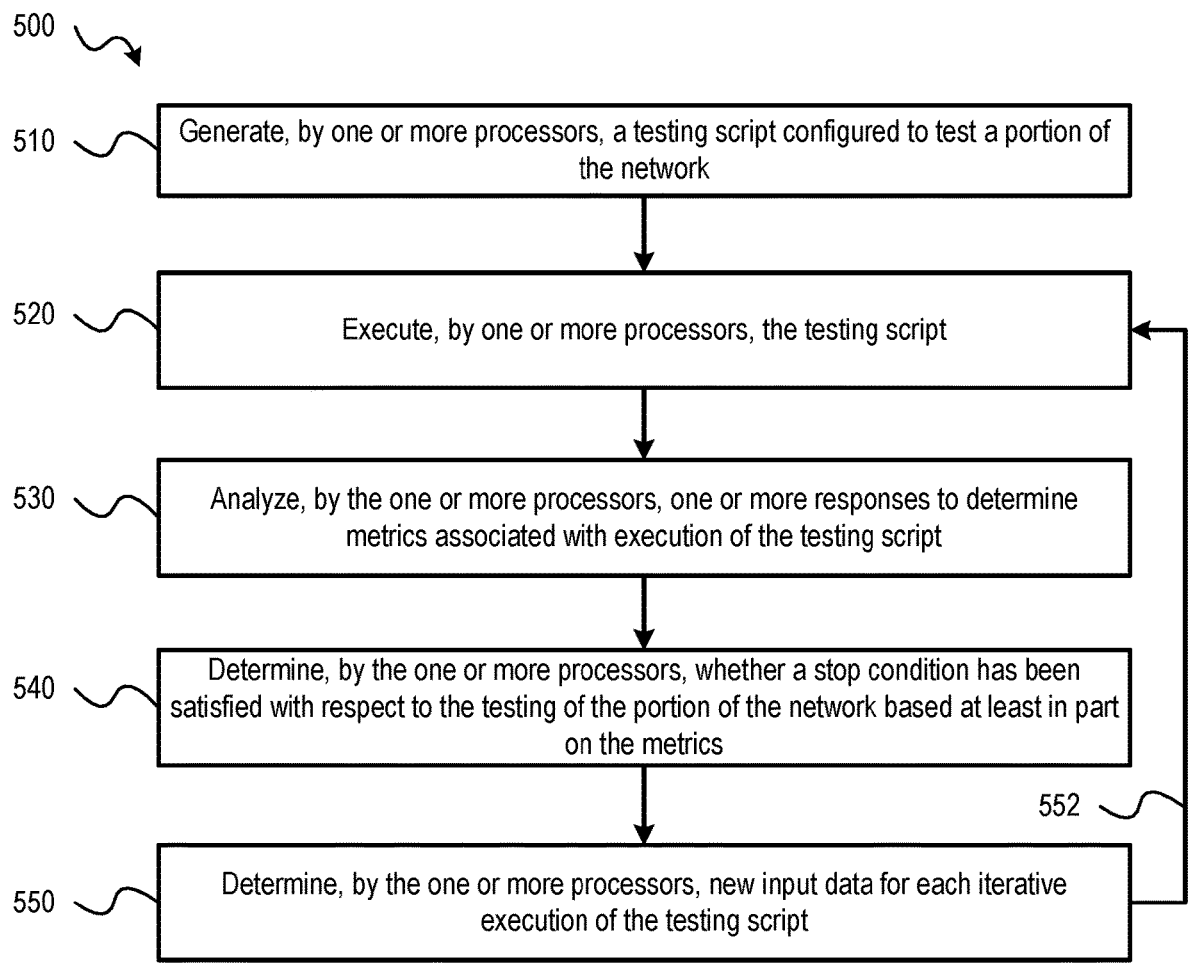
FIG. 5 is a flow diagram of an exemplary method performing quantitative testing of a network in accordance with aspects of the present disclosure.

Referring to FIG. 5, a flow diagram of an exemplary method performing quantitative testing of a network in accordance with aspects of the present disclosure is shown as a method 500. In an aspect, the method 500 may be performed by a device, such as the network testing device 110 of FIG. 1. Steps of the method 500 may be stored as instructions (e.g., the instructions 122 of FIG. 1) that, when executed by one or more processors (e.g., the one or more processors 112 of FIG. 1), cause the one or more processors to perform operations for testing networks, network services, or APIS in accordance with aspects of the present disclosure.

At step 510, the method 500 includes generating, by one or more processors, a testing script configured to test a portion of the network. As described above with reference to FIGS. 1-3, the testing script may include one or more requests parameterized based on first input data derived from a historical database, such as the input database 210 of FIG. 2. The portion of the network may include a service of the network, an API of the network, or both and may be determined based on information stored at a test configuration database, such as the test plan described above with reference to FIG. 2. As described above, the testing script may include requests, such as API calls, configured to interact with the network services and APIs in order to test the network services and their supporting APIs. The API calls may be configured based on API configuration data stored in an API configuration database, as described with reference to FIG. 2, which may identify parameters used for interacting with the APIs. Other data values used to configure parameters of the testing data may be derived from a subset of information stored in a historical information database (e.g., the input database 210 of FIG. 2).

At step 520, the method 500 includes executing, by one or more processors, the testing script. As described above, execution of the testing script may include transmitting one or more requests to the network and receiving one or more responses to the one or more requests from the network. As illustrated with respect to Table 1, above, the responses received during execution of the testing script may depend on whether the requests are properly configured. For example, a request parameterized with improper user identification information may result in a response indicating an error "404 Not Found" while a request parameterized with improper authentication information may result in an error "403 Forbidden" response being received. Other responses may be provided depending on the particular information included in the request and the API or functionality associated with the request.

At step 530, the method 500 includes analyzing, by the one or more processors, the responses to determine metrics associated with execution of the testing script. As described above with reference to FIG. 2, analyzing the one or more responses may include identifying successfully tested conditions associated with the portion of the network, unsuccessfully tested conditions associated with the portion of the network, untested conditions associated with the portion of the network, errors that occurred during testing, other types of outcomes or results, or combinations thereof. In an aspect, the metrics determined based on the analyzing may be used to calculate scores associated with the testing, as described above with respect to the scoring engine 260 of FIG. 2. At step 540, the method 500 includes determining, by the one or more processors, whether a stop condition has been satisfied with respect to the testing of the portion of the network based at least in part on the metrics. Information associated with the metrics, such as the scores, may be used to determine whether a stop condition has been reached, as described above with reference to FIGS. 1-3. If a stop condition has been reached, testing may terminate.

However, in response to a determination that the stop condition has not been satisfied, the method 500 may include iteratively executing the testing script using requests parameterized with new input data until the stop condition is satisfied. As shown at step 550, for each new iteration of the testing, the method 500 may include determining the new input data for each iterative execution of the testing script. The new input data may be selected from the historical database via a data diffusion process based at least in part on the metrics derived from previous executions of the testing script. The data diffusion process may be configured to select the new data based on the determined metrics or scores such that the new input data is dissimilar to the input data used in previous executions of the testing script. By selecting dissimilar data, each new execution of the testing script may be configured to test previously untested conditions and functionality of the portion of the network being tested, such as functionality of a network service or API that could not be tested due to incorrect or incomplete information being included in the parameters of the previous requests used for the testing script execution. In this manner, each new iteration of the testing script execution may result in additional functionality of the network service or API being tested and minimizing the redundancy between testing performed during each iteration. As indicated by arrow 552, once the new input data is determined using the data diffusion process, the method 500 may return to step 520, where the testing script parameterized with the new input data may be executed. Steps 520-550 may be repeated until the stop condition is reached.

As shown above, the iterative testing process utilized by the method 500 of embodiments may use a subset of available data to configure testing of networks, network services, and the APIs that support the network services. Moreover, smaller subsets of data may be selected for each testing cycle, thereby allowing each testing cycle to be performed rapidly and feedback obtained regarding the results of the executed testing cycle. The feedback may then be used to refine subsequent iterations of the testing, such as to include new ranges of data, new types of data, or other types of dissimilar data (e.g., data dissimilar to the data used in previous testing cycles), and the like. The use of different and new data in each testing cycle may allow new test conditions and use cases to be tested during each subsequent testing cycle and may eventually result in convergence to a sufficient level of testing. Once the testing has converged to the sufficient level of testing (e.g., as described above with respect to the stop testing condition(s)), the testing may be terminated. Thus, the method 500 provide an efficient technique to rapidly test networks, network-based services, and the APIs that are used to support the network-based services in an automated fashion.

It is noted that the method 500 may be utilized to test APIs and services deployed on 4G networks, 5G networks, or other types of networks, such as subsequent generations of cellular communication networks. Moreover, the system 100 and the concepts described with reference to FIGS. 1-4 may also be utilized to facilitate efficient and rapid testing 4G networks, 5G networks, or other types of networks, such as subsequent generations of cellular communication networks. Accordingly, it is to be understood that embodiments of the present disclosure may be utilized to perform testing of APIs and services for all types of networks, such as 4G networks, 5G networks, and subsequent types of networks where APIs are utilized to provide services to network users and services providers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-5) may comprise processors, electronics devices, hardware devices, electronics components, logical circuits, memories, software codes, firmware codes, etc., or any combination thereof. In addition, features discussed herein relating to FIGS. 1-5 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for quantitative testing of a network, the system comprising:

a memory storing a historical database, test configuration database, and an application programming interface (API) configuration database associated with one or more APIs of the network, one or more processors communicatively coupled to the memory and configured to:

generate a testing script configured to test a portion of the network, wherein the testing script comprises one or more requests parameterized based on first input data derived from a portion of the historical database, and wherein the portion of the network comprises a service of the network, an API of the network, or both and is determined based on information stored at the test configuration database;

execute the testing script, wherein execution of the testing script comprises:

transmitting the one or more requests to the network; and receiving one or more responses to the one or more requests from the network;

analyze the one or more responses to determine metrics associated with the execution of the testing script, wherein the metrics identify successfully tested conditions associated with the portion of the network, unsuccessfully tested conditions associated with the portion of the network, untested conditions associated with the portion of the network, or a combination thereof;

determine, based at least in part on the metrics, whether a stop condition has been satisfied with respect to the testing of the portion of the network based at least in part on the metrics; and in response to a determination that the stop condition has not been satisfied, iteratively execute the testing script using requests parameterized with new input data until the stop condition is satisfied, wherein the new input data for each iterative execution of the testing script is automatically selected from the historical database via a data diffusion process based at least in part on a similarity score included in the metrics, wherein the similarity score is derived from previous executions of the testing script and the data diffusion process is configured to automatically select the new input data based on a dissimilarity of the new input data to the first input data utilized during a previous execution of the testing script, and wherein the new input data is configured to test one or more conditions that were identified as untested conditions during previous executions of the testing script.

2. The system of claim 1, wherein, for a particular iteration of the execution of the testing script, the data diffusion process is configured to select at least a portion of the new input data from the historical database based on the metrics such that the new input data is dissimilar to input data utilized in previous iterations of the execution of the testing script.

3. The system of claim 2, wherein the one or more processors are configured to calculate the similarity score between the first input data and the historical database, and wherein the new input data comprises data selected from the historical database.

4. The system of claim 1, wherein the one or more processors are configured to calculate an error rate score indicative of errors that occurred during execution of the testing script, wherein the stop condition is based at least in part on whether the score associated with the error rate satisfies a threshold score, and wherein the metrics include the error rate score.

5. The system of claim 1, wherein the API configuration data comprises information associated with conditions of the API, wherein the one or more processors are configured to calculate a score representative of a total percentage of the conditions of the API that were tested during execution of the testing script, and wherein the stop condition is based at least in part on whether the score representative of the total percentage of the conditions of the API that were tested satisfies a threshold quantity of conditions.

6. The system of claim 1, wherein the one or more processors are configured to:

probe the network to detect new services deployed to the network; and automatically update the API configuration data in response to detection of a new service deployed to the network based on the probing.

7. The system of claim 1, wherein the one or more processors are configured to validate the one or more responses received from the network based on information associated with known valid responses, wherein the metrics are determined based at least in part on whether the one or more responses received from the network during execution of the testing script are valid responses.

8. A method for quantitative testing of a network, the method comprising:

generating, by one or more processors, a testing script configured to test a portion of the network, wherein the testing script comprises one or more requests parameterized based on first input data derived from a historical database, and wherein the portion of the network comprises a service of the network, an API of the network, or both and is determined based on information stored at a test configuration database;

executing, by one or more processors, the testing script, wherein execution of the testing script comprises:

transmitting the one or more requests to the network; and receiving one or more responses to the one or more requests from the network;

analyzing, by the one or more processors, the one or more responses to determine metrics associated with execution of the testing script, wherein the metrics identify successfully tested conditions associated with the portion of the network, unsuccessfully tested conditions associated with the portion of the network, untested conditions associated with the portion of the network, or a combination thereof;

determining, by the one or more processors, whether a stop condition has been satisfied with respect to the testing of the portion of the network based at least in part on the metrics; and in response to a determination that the stop condition has not been satisfied, iteratively executing the testing script using requests parameterized with new input data until the stop condition is satisfied, wherein the new input data for each iterative execution of the testing script is selected from the historical database via a data diffusion process based at least in part on a similarity score included in the metrics, wherein the similarity score is derived from previous executions of the testing script and the data diffusion process is configured to automatically select the new input data based on a dissimilarity of the new input data to the first input data utilized during a previous execution of the testing script, and wherein the new input data is configured to test one or more conditions that were identified as untested conditions during previous executions of the testing script.

9. The method of claim 8, wherein, for a particular iteration of the execution of the testing script, the data diffusion process is configured to select at least a portion of the new input data from the historical database based on the metrics such that the new input data is dissimilar to input data utilized in previous executions of the testing script, the input data including the first input data.

10. The method of claim 9, further comprising calculating similarity scores between the input data utilized during executions of the testing script and the historical database, wherein the new input data comprises data that is dissimilar to the input data utilized in the previous executions of the testing script is determined based at least in part on the similarity scores.

11. The method of claim 8, further comprising calculating a score associated with an error rate indicative of errors that occurred during execution of the testing script, wherein the stop condition is based at least in part on whether the score associated with the error rate satisfies a threshold score.

12. The method of claim 8, wherein the API configuration database comprises information associated with conditions of the API, and wherein the method comprises:
calculating a score representative of a total percentage of the conditions of the API that were tested during execution of the testing script,
wherein the stop condition is based at least in part on whether the score representative of the total percentage of the conditions of the API that were tested satisfies a threshold quantity of conditions.

13. The method of claim 8, further comprising:
probing the network to detect new services, new APIs, or both deployed to the network; and
automatically update the API configuration database in response to detection of the new service, the new API, or both deployed to the network based on the probing.

14. The method of claim 8, further comprising validating the one or more responses received from the network based on information associated with known valid responses, wherein the metrics are determined based at least in part on whether the one or more responses received from the network during execution of the testing script are valid responses.

15. A non-transitory computer-readable storage medium storing instructions that, when executed by one or more processors, cause the one or more processors to perform operations for quantitative testing of a network, the operations comprising:
generating a testing script configured to test a portion of the network,
wherein the testing script comprises one or more requests parameterized based on first input data derived from a historical database, and
wherein the portion of the network comprises a service of the network, an API of the network, or both and is determined based on information stored at a test configuration database;
executing the testing script,
wherein execution of the testing script comprises:
transmitting the one or more requests to the network; and
receiving one or more responses to the one or more requests from the network;
analyzing the one or more responses to determine metrics associated with the execution of the testing script,
wherein the metrics identify successfully tested conditions associated with the portion of the network, unsuccessfully tested conditions associated with the portion of the network, untested conditions associated with the portion of the network, or a combination thereof;
determining whether a stop condition has been satisfied with respect to the testing of the portion of the network based at least in part on the metrics; and
in response to a determination that the stop condition has not been satisfied, iteratively executing the testing script using requests parameterized with new input data until the stop condition is satisfied,
wherein the new input data for each iterative execution of the testing script is automatically selected from the historical database via a data diffusion process based at least in part on a similarity score included in the metrics, wherein the similarity score is derived from previous executions of the testing script and the data diffusion process is configured to automatically select the new input data based on a dissimilarity of the new input data to the first input data utilized during a previous execution of the testing script, and wherein the new input data is configured to test one or more conditions that were identified as untested conditions during previous executions of the testing script.

16. The non-transitory computer-readable storage medium of claim 15, wherein, for a particular iteration of the execution of the testing script, the data diffusion process is configured to select at least a portion of the new input data from the historical database based on the metrics such that the new input data includes data that is dissimilar to input data utilized in previous executions of the testing script, the input data including the first input data.

17. The non-transitory computer-readable storage medium of claim 16, further comprising calculating similarity scores between the input data utilized during the previous executions of the testing script and the historical database, wherein the new input data that is dissimilar to the input data utilized in the previous executions of the testing script is determined based at least in part on the similarity scores.

18. The non-transitory computer-readable storage medium of claim 15, further comprising calculating a score associated with an error rate, a number of conditions tested, a number of successful conditions tested, or a combination thereof, and wherein the stop condition is based at least in part on whether the score satisfies a threshold score.

* * * * *